United States Patent
Almqvist et al.

(10) Patent No.: US 10,704,653 B2
(45) Date of Patent: Jul. 7, 2020

(54) GEARBOX FOR A RACK AND PINION LINEAR TRANSMISSION AND DRILLSTAND INCLUDING A GEARBOX AND A RACK

(71) Applicant: HUSQVARNA AB, Huskvarna (SE)

(72) Inventors: Torbjörn Almqvist, Göteborg (SE); David Grennhag, Göteborg (SE)

(73) Assignee: HUSQVARNA AB, Huskvarna (SE)

( * ) Notice: Subject to any disclaimer, the term of this patent is extended or adjusted under 35 U.S.C. 154(b) by 8 days.

(21) Appl. No.: 16/091,762

(22) PCT Filed: Apr. 6, 2016

(86) PCT No.: PCT/EP2016/057526
§ 371 (c)(1),
(2) Date: Oct. 5, 2018

(87) PCT Pub. No.: WO2017/174128
PCT Pub. Date: Oct. 12, 2017

(65) Prior Publication Data
US 2019/0093738 A1    Mar. 28, 2019

(51) Int. Cl.
*F16H 3/089* (2006.01)
*F16H 19/04* (2006.01)
(Continued)

(52) U.S. Cl.
CPC ............ *F16H 3/089* (2013.01); *B25H 1/0042* (2013.01); *B25H 1/0064* (2013.01); *F16H 3/083* (2013.01);
(Continued)

(58) Field of Classification Search
CPC ........ F16H 3/089; F16H 19/043; F16H 19/04; F16H 3/083; F16H 2200/0034; B25H 1/0064; B25H 1/0042
See application file for complete search history.

(56) References Cited

U.S. PATENT DOCUMENTS 2,995,960 A   8/1961  Riley, Jr. et al.
6,692,201 B2  2/2004  Soderman
(Continued)

FOREIGN PATENT DOCUMENTS

DE    34 08 457 A1   9/1985
DE    37 24 232 C2   11/1989
(Continued)

OTHER PUBLICATIONS

"Motion solutions turn to the rack," Retrieved from the Internet URL: https://www.google.co.in/imgres?imgurl=http://motionsystemdesign.com/images/glass-stacker.jpg&imgrefurl=http://machinedesign.com/technologies/motion-solutions-turn-rack&h=680&w=408&tbnid=vc80xzxtxD1wWM:&docid=uq5As9mhH5c9KM&ei=-oVhVofNEcG3uASxv6XgBQ&tbm=isch&ved=0ahUKEwiHstm0mcLJAhXBG44KHbFfCVw4yAEQMwgQKA0wDQ, on Dec. 4, 2015, pp. 1-1.

(Continued)

*Primary Examiner* — Sunil K Singh
*Assistant Examiner* — Paul M Janeski
(74) *Attorney, Agent, or Firm* — Burr & Forman, LLP

(57) ABSTRACT

A gearbox for a rack (6) and pinion (4) linear transmission, said gearbox further including—a reduction gear train (1-4) having at least a first (1), a second (2), a third (3), and a fourth gear wheel (4), where the fourth gear wheel is the pinion (4) for rotary engagement with the rack (6); a rotary input shaft (7) operatively connected to the gear train (1-4) to effect a linear relative movement between the rack (6) and the pinion (4); and an intermediate shaft (8) on which the first (1) and the second (2) gear wheel are fixed; the third gear wheel (3) being fixed on the input shaft (7), the fourth gear wheel (4) being journalled to enable it to rotate freely on the input shaft (7) and constituting the pinion (4), and the (Continued)

first gear wheel (1) and the fourth gear wheel (4) being in constant meshing engagement with each other.

17 Claims, 4 Drawing Sheets

(51) Int. Cl.
  *B25H 1/00* (2006.01)
  *F16H 3/083* (2006.01)
(52) U.S. Cl.
  CPC ........... *F16H 19/04* (2013.01); *F16H 19/043* (2013.01); *F16H 2200/0034* (2013.01)

(56) References Cited

U.S. PATENT DOCUMENTS

| | | | |
|---|---|---|---|
| 8,888,417 B2 | 11/2014 | Jonsson et al. | |
| 2005/0214084 A1* | 9/2005 | Baratta | B23D 47/02 408/111 |

FOREIGN PATENT DOCUMENTS

| | | |
|---|---|---|
| DE | 101 34 928 A1 | 10/2002 |
| DE | 10 2011 122 028 A1 | 6/2013 |
| WO | 2008/026974 A1 | 3/2008 |

OTHER PUBLICATIONS

"Technicopedia: 8094 Control Center," Retrieved from the Internet URL: http://www.technicopedia.com/8094.html, on Dec. 4, 2015, pp. 1-11.
International Search Report and Written Opinion for International Application No. PCT/EP2016/057526 dated Dec. 13, 2016.
International Preliminary Report on Patentability for International Application No. PCT/EP2016/057526 dated Oct. 9, 2018.

* cited by examiner

GEARBOX FOR A RACK AND PINION LINEAR TRANSMISSION AND DRILLSTAND INCLUDING A GEARBOX AND A RACK

TECHNICAL FIELD

The present invention relates to a gearbox for a rack and pinion linear transmission, said gearbox further including
a reduction gear train having at least a first, a second, a third, and a fourth gear wheel, where the fourth gear wheel is the pinion for rotary engagement with the rack;
a rotary input shaft operatively connected to the gear train to effect a linear relative movement between the rack and the pinion; and
an intermediate shaft on which the first and the second gear wheel are fixed.

BACKGROUND ART

A rack and pinion is a type of linear actuator that comprises a pair of teethed members which convert rotational motion into linear motion. A circular teethed member, i.e. a gear wheel called "the pinion", engages the teeth of a linear bar called "the rack". Rotational motion applied to the pinion causes the rack to move relative to the pinion, thereby translating the rotational motion of the pinion into linear motion. Rack and pinion combinations are often used as part of a simple linear actuator in a drill stand, for example, where the rotation of a shaft powered by hand or by a motor is converted to linear motion.

U.S. Pat. No. 6,692,201 B2 (Soderman) discloses a portable drill press that has a rack bar with a brace attached at one end. A pinion slide assembly is slideably engaged with the rack bar such that the pinion is in rotational engagement with a rack. The pinion slide assembly may be retained on the rack bar by a bolt. The pinion may be attached to a pinion shaft that may be rotated by a rotation lever. Thus, the pinion shaft is the input shaft and the design is too simple to be called a gearbox. A mounting bracket may be attached to the pinion slide assembly for attachment of a hand drill.

DE 37 24 232 C2 (Fein GmbH & Co.) discloses a drill stand with a base part comprising a foot, in particular an adhesive foot, as well as a machine slide which is displaceably mounted on the base part and is traversable relative to the base part by an adjusting device which can be driven by a rotatable manual actuating device. Thus, the pinion is fixed to the input shaft and the design is too simple to be called a gearbox. In order to improve the drill stand in such a way that detachment of the foot from the bearing surface can be avoided, it is proposed that the manual actuating device that rotates the input shaft have a drive torque limiter.

DE 34 08 457 A1 (Podobnik) relates to an upright for basic core-drilling tools, in particular for the working of concrete, consisting of a base plate with column and slide guide for accommodating the drive motor with drilling spindle, in which the column is equipped with a milled-in and welded toothed rack and a locking groove, and the slide running on the column is equipped with a roller guide with eight rollers or shafts running on the sides of the column, and the rollers and shafts run on the sides of the column without play. The advantages of the device according to the invention are that a good cutting capacity of the drill bit is achieved and exact spot drilling is obtained through precise guidance of the drilling tool. Also in this case, the pinion is fixed to the input shaft and the design is too simple to be called a gearbox.

U.S. Pat. No. 2,995,960 (Riley, Jr., et al.) relates to a shiftable two-speed feeding and retracting means for a power-operated tool, and more particularly, to such means which is associated with a drill stand having a supporting column and further having a drill carriage including a power-operated drill positioned upon said column. The two-speed gearbox is complicated and comprises an axially displaceable input shaft, an intermediate shaft and a transverse shaft. Further, it comprises two gear wheels that are axially movable on the input shaft and selectively lockable thereto, two gear wheels and a worm fixed to the auxiliary shaft, and a worm wheel and a pinion fixed to the transverse shaft.

DE 10 2011 122 028 A1 (Kastner) relates to a drill stand has a rack gear portion that is secured at a guide column portion. An auxiliary gear box is connected with a speed reduction gear element for reducing the speed of a feed mechanism. The speed reduction gear element is provided with a drive shaft and a driven shaft. The rotating movement of a rotary drive unit is transferred on a rack gear intervention gear wheel through the auxiliary gear box or without the auxiliary gear box. Also here, the gearbox is unnecessarily complicated. Even though it is a single speed gearbox, it comprises an input shaft, an intermediate shaft and a transverse shaft, and further a gear fixed on the input shaft, a gear and a worm fixed on the intermediate shaft, and a worm wheel and a pinion fixed on the transverse shaft.

U.S. Pat. No. 8,888,417 B2 (Jonsson, et al.) is assigned to the assignee of the present application and relates to methods and systems for automatically feeding a feeding housing of a drilling device. The drilling device includes a drill stand, a drilling machine and a feeding housing. Further, the drilling machine, which is suspended by the feeding housing, includes a drill with a drilling motor for performing a drilling operation through a drilling object. The feeding unit includes an electric feeding motor for feeding the feeding housing along the stand. Further, the feeding unit also includes a controller for manually influencing the feeding motor's direction of rotation, speed and feeding force. No description of a gearbox is included.

The gearbox of the present invention can be applied in the system of the '417 patent but can, of course, be applied also in drill stands of the types referred to above and also in other rack and pinion applications.

In all drill stands of the types referred to above, the teeth of the rack and pinion transmission will be exposed to high levels of stress, especially in cases where the drill gets stuck during drilling, and the operator tries to make it come loose again.

SUMMARY OF THE INVENTION

The object of the present invention is to provide a compact gearbox of a simplified design.

Another object is to reduce the weight of the gearbox.

Another object is to provide a compact gearbox which easily may be modified to include two pinions for simultaneous engagement with the rack and/or be a two-step gearbox.

At least one of the objects is achieved in accordance with the present invention in that in a gearbox of the kind defined in the first paragraph:
the third gear wheel being fixed on the input shaft, the fourth gear wheel being journalled on the input shaft to enable the fourth gear wheel to rotate freely relative to the input shaft, and the first gear wheel and the fourth gear wheel being in constant meshing engagement with each other.

By having the pinion journalled to enable it to rotate freely on the input shaft the number of shafts can be reduced. This makes the gearbox more compact, simplifies the design and reduces the weight compared to a gear box having a separate shaft for the pinion.

In addition, by these constructive measures, the resulting gearbox can be modified easily to include two pinions for simultaneous engagement with the rack and/or be a two-step gearbox.

In a preferred embodiment, an additional shaft or axle is provided, on which a fifth gear wheel is mounted, and the input shaft drives the third gear wheel that is fixed on the input shaft. The fifth gear wheel may be journalled to rotate freely on the shaft or axle, or it can be fixed thereto. The third gear wheel is in meshing engagement with the second gear wheel and thereby also drives the first gear wheel that both are fixed to the intermediate shaft, and the first gear wheel is in meshing engagement with the fifth gear wheel as well as the fourth gear wheel that rotates freely but is axially fixed on the input shaft. Both of the fourth gear wheel and the fifth gear wheel constitute pinions, so that the two pinions can be set to engage the rack simultaneously. Thereby, the number of pinion teeth in meshing engagement with the rack teeth is doubled, at least theoretically, which reduces the stress on the teeth.

In another preferred embodiment, the fourth gear wheel and the input shaft are displaceable relative each other between two positions, and a locking device is provided for locking the fourth gear wheel to the input shaft at one of the two positions but permitting the fourth gear wheel and the input shaft to rotate freely relative each other in the other position. Thereby, prerequisites for a two-speed gearbox are created.

Then, it is preferred that the fourth gear wheel and the input shaft are displaceable relative each other between two positions, and a locking device is provided for locking the fourth gear wheel to the input shaft at one of the two positions but permitting the fourth gear wheel and the input shaft to rotate freely relative each other in the other position.

Further, the fourth gear wheel preferably is axially fixed in the gearbox and constitutes the pinion, while the input shaft is axially displaceable in the gearbox.

Suitably, the locking device comprises a locking member, e.g. a locking pin, having a portion projecting radially from the input shaft, and a side of the fourth gear wheel has a recess matching said portion of the locking member.

It is also suitable that a mechanism is provided for displacing the input shaft between said two positions.

The gearbox preferably has two reduction ratios, namely:
a first one where the fourth gear wheel is locked to the input shaft; and
a second one where the input shaft drives the third gear wheel that is fixed on the input shaft, which in turn drives the second gear wheel and thereby also the first gear wheel that both are fixed to the intermediate shaft, and the first gear wheel drives the fourth gear wheel that rotates freely on the input shaft, so that the gearbox is a two-speed gearbox.

Then, in a preferred embodiment, an additional shaft carrying a fifth gear wheel is provided, and the first gear wheel is in a constant meshing engagement with the fourth gear wheel and the fifth gear wheel, and both of the fourth and the fifth gear wheels constitute pinions that can be set in simultaneous meshing engagement with the rack. Thereby, a two-speed gearbox is obtained, in which the number of pinion teeth in meshing engagement with the rack teeth is doubled, at least theoretically, which reduces the stress on the teeth.

The gearbox described above is suitable for a drill stand including a drill column supporting a rack running along the drill column, and a carriage arranged on the drill column, the carriage including the gearbox engaging the rack by a rack and pinion transmission for movement up and down the rack.

BRIEF DESCRIPTION OF THE DRAWINGS

In the following, the invention will be described in more detail with reference to preferred embodiments and the appended drawings.

MODE(S) FOR CARRYING OUT THE INVENTION

Figure 1:
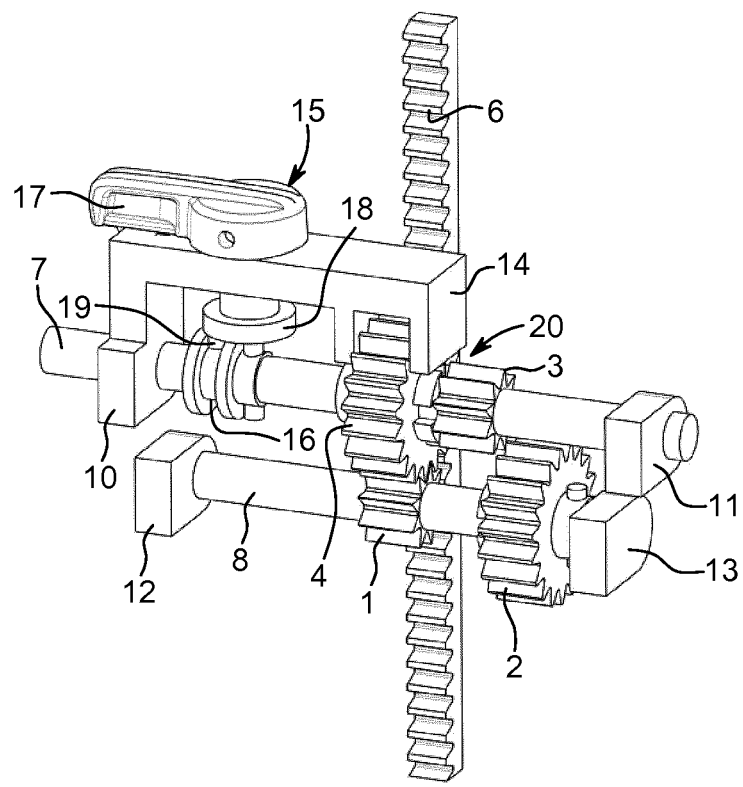
FIG. 1 is a schematic isometric view of the interior of a two-speed gearbox and rack providing a rack and pinion transmission and providing a first reduction ratio.
Figure 2:
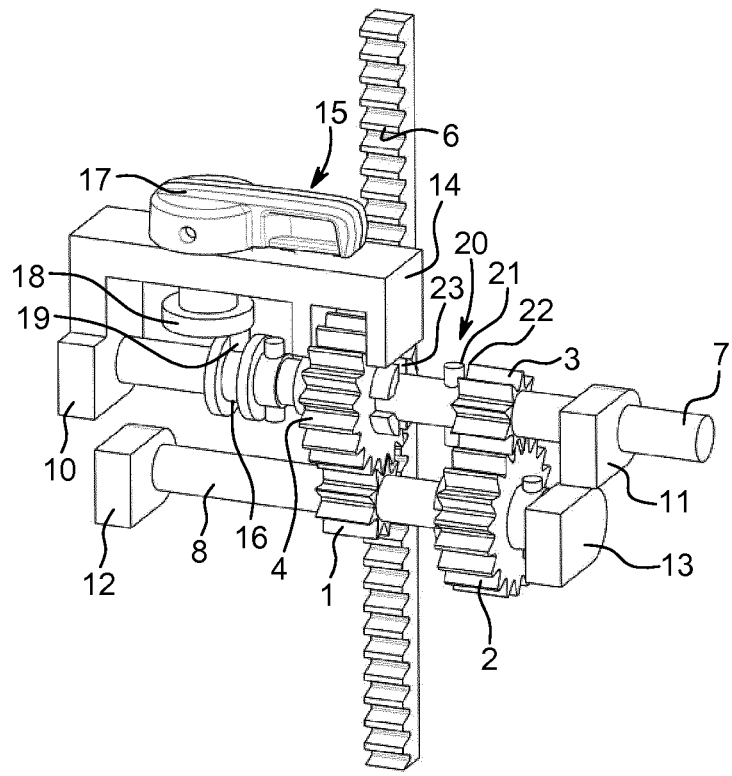
FIG. 2 is a schematic isometric view of the interior of the two-speed gearbox of FIG. 1 when providing a second reduction ratio.

FIGS. 1 and 2 show a first preferred embodiment of a gearbox and rack 6 in accordance with the present invention. Of course, the gearbox includes a housing, but to facilitate the understanding of the operation of the gearbox, only its interior is shown, not its housing. The shown gearbox is a two-speed gearbox and provides a rack 6 and pinion 4 transmission. Two-speed gearboxes are useful for drill stands, where there is a need for a light-weight two-speed gearbox for movement of the conventional carriage, where the drill motor is attached. The gearbox housing, not shown, is attached to or integral with the carriage for movement up and down the rack.

The gearbox includes a reduction gear train 1-4 having at least a first 1, a second 2, a third 3, and a fourth gear wheel 4, where the fourth gear wheel is the pinion 4 in rotary engagement with the rack 6. Further, the gearbox includes a rotary input shaft 7 operatively connected to the gear train 1-4 to effect a linear relative movement between the rack 6 and the pinion 4, and a rotary intermediate shaft 8 on which the first 1 and the second 2 gear wheels are fixed. The two shafts 7 and 8 are parallel to each other. The arrangement of the gear wheels is such that the third gear wheel 3 is fixed on the input shaft 7, the fourth gear wheel 4 is journalled to enable it to rotate freely on the input shaft 7 and constitutes the pinion 4, and the first gear wheel 1 and the fourth gear wheel 4 are in constant meshing engagement with each other. The ends of the input shaft 7 extends through bearing housings 10 and 11 and are journalled in and axially movable in them, and the intermediate shaft 8 is journalled in bearing housings 12 and 13. The bearing housings 10-13 are fixed in the gearbox housing (not shown), but for illustrative purposes they can be regarded as representing the gearbox housing. The input shaft 7 may be rotated manually by a crank (not shown) with one or more arms or by a motor.

The fourth gear wheel 4 and the input shaft 7 are displaceable relative each other between two positions, and a locking device 20 is provided for locking the fourth gear wheel 4 to the input shaft 7 at one of the two positions but permitting the fourth gear wheel 4 and the input shaft 7 to rotate freely relative each other in the other position. The fourth gear wheel 4 is journalled on the input shaft 7 by means of a bearing, preferably a plain bearing, but if desired a rolling bearing, e.g. a needle bearing, may be used. The fourth gear wheel 4 is axially fixed in the gearbox and constitutes the pinion, while the input shaft 7 is axially displaceable in the gearbox. In the shown embodiment, the locking device 20 comprises a locking member 21 having a portion 22 projecting radially from the input shaft 7, and a side of the fourth gear wheel 4 facing the locking member 21 has a recess 23 matching said portion 22 of the locking member 21. The fourth gear wheel 4 may have an axial collar, in which two diametrically opposed recesses 23 are located. Preferably, the locking member is a through locking pin 21.

As the fourth gear wheel or pinion 4 is journalled to enable it to rotate freely on the input shaft 7, a holder 14 is provided for maintaining it in correct position axially in relation to the other gear wheels. The holder 14 may be of fork shape and is carried by the gear housing at least indirectly. The fork-shaped holder 14 straddles the fourth gear wheel 4 and has a fork prong on each axial side of the gear wheel. In the shown embodiment, a carrying arm extends from bearing housing 10 to the holder 14. However, if desired the holder 14 may be integrated in the gearbox housing. A mechanism 15 is provided for displacing the input shaft 7 axially between its two positions. In the shown embodiment the mechanism 15 comprises a rotary handle 17 that naturally is located outside the gearbox housing (not shown). The handle 17 rotates a shaft (not shown) that extends through the wall of the gearbox housing and through said arm and ends in a radial disk 18 having an eccentrically mounted peg 19. The input shaft 7 is provided with structure defining a peripheral groove 16. The peg extends into the groove 16, so that a rotation of the handle 17 will displace the input shaft 7 axially and thereby either lock the fourth gear wheel 4 to the input shaft 7 or unlock the gear wheel, so that it can rotate freely on the input shaft 7.

The first gear wheel 1 and the second gear wheel 2, which are fixed to the intermediate shaft 8, are spaced from each other a distance that is equal to the axial displacement of the input shaft 7. In FIG. 1 the input shaft 7 is displaced to its left-hand end position, so that the locking mechanism 20 locks the fourth gear wheel 4 to the input shaft 7. Thereby the fourth gear wheel 7 engages the first gear wheel 1 and rotates the intermediate shaft 8 with the fixed second gear wheel 2. The third gear wheel 3, which is fixed to the input shaft 7, rotates with the input shaft, but is not in engagement with the second gear wheel 2, because the third gear wheel 3 is positioned just opposite the gap separating the first and second gear wheels from each other. Thus FIG. 1 shows the gear box when the input shaft 7 is positioned to give a first reduction ratio.

FIG. 2 shows the gearbox when the input shaft 7 is positioned in its right-hand end position to give a second reduction ratio. Here, the fourth gear wheel 4 is free to rotate on the input shaft 7, while the axial displacement of the input shaft 7 has caused the third gear wheel 3 to engage the second gear wheel 2. As both of the second and the first gear wheels, 2 and 1, respectively, are fixed to the intermediate shaft 8, the rotation of the input shaft 7 is transferred to the first gear wheel 1, which is in constant engagement with the fourth gear wheel 4. The first gear wheel 1 and the third gear wheel 3 are comparatively small gear wheels having fourteen teeth, for example, while the second gear wheel 2 and the fourth gear wheel 4 are larger and may have twenty-eight teeth, for example. In this example, the input shaft 7 has to make four revolutions to make the fourth gear wheel, the pinion 4, make one revolution. Consequently, with the data given above and the first reduction ratio, a complete revolution of the input shaft 7 will move the carriage a distance corresponding to twenty-eight teeth up or down the rack 6, while the second reduction ratio will result in a distance corresponding to only seven teeth.

This solution is space saving and weight saving, since pinion gear wheel 4 is mounted on the input shaft 7 and does not require an extra shaft. Normally the use of two shafts limits you to using larger gear wheels to get a desired high reduction ratio, and it also switches rotation direction. Consequently, the size of the gearbox can be reduced. Another advantage is that the pinion gear wheel 4 rotates in the same direction as the input shaft 7, so that the input rotation direction is the same as the output rotation direction. Further, there is no need to move an input lever from one shaft to another when changing gear ratio in the two-speed gearbox.

Figure 3:
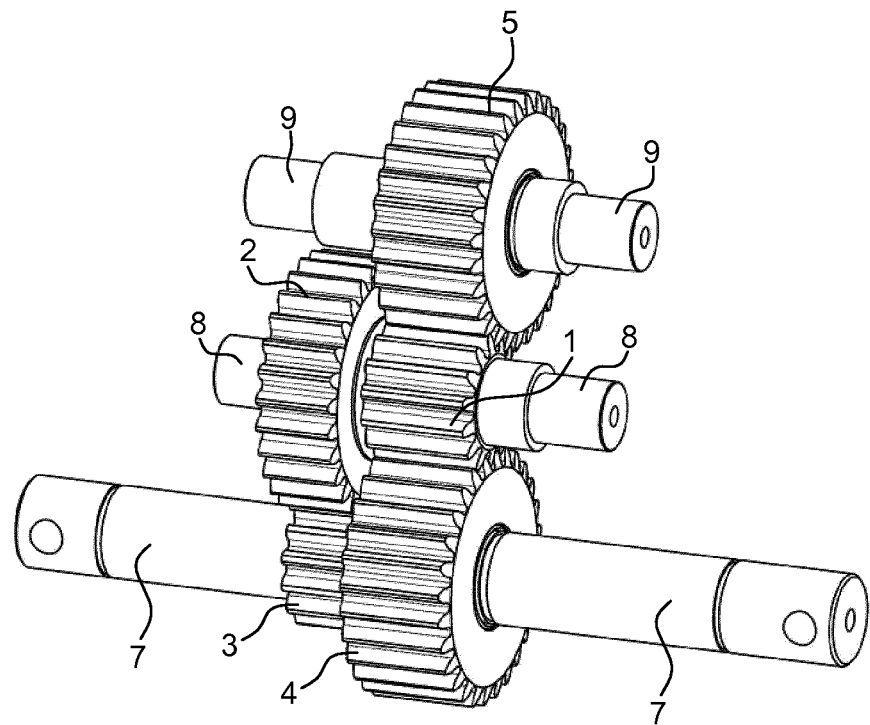
FIG. 3 is a schematic isometric view of the interior of a single-speed gearbox having two pinions for simultaneous engagement with a rack.
Figure 4:
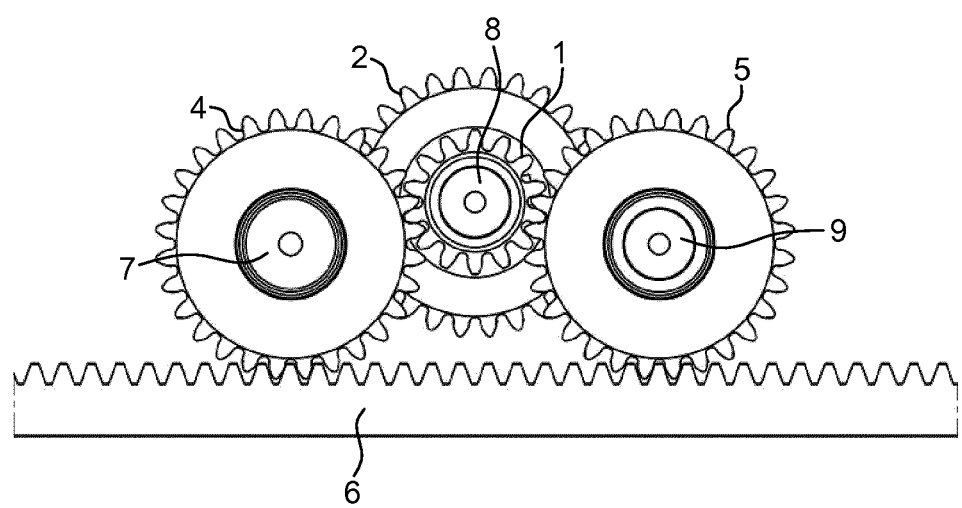
FIG. 4 is an end view of the gearbox of FIG. 3 showing the teeth of the two pinions simultaneously engaging the teeth of the rack.

FIGS. 3 and 4 show a second preferred embodiment of a gearbox and rack 6 in accordance with the present invention. Like in the first embodiment described above, the gearbox of course includes a housing, but to facilitate the understanding of the operation of the gearbox, only its interior is shown, not its housing. The shown gearbox is a single-speed gearbox and provides a rack 6 and pinion 4 transmission. Also single-speed gearboxes are useful for drill stands, where there is a need for a light-weight single-speed gearbox for movement of the carriage, where the drill motor is attached. The housing, not shown, is attached to or integral with the carriage for movement up and down the rack 6.

In the second preferred embodiment, the gearbox includes a reduction gear train 1-5 having a first 1, a second 2, a third 3, a fourth 4, and a fifth gear wheel 5, where the fourth and fifth gear wheels are pinion 4 and 5, respectively, in rotary engagement with the rack 6. Further, the gearbox includes an input shaft 7 operatively connected to the gear train 1-5 to effect a linear relative movement between the rack 6 and the two pinions 4 and 5, an intermediate shaft 8 on which the first 1 and the second 2 gear wheels are fixed in a side by side relationship, and an additional shaft or axle 9, on which the fifth gear wheel 5 is mounted. The fifth gear wheel 5 is either journalled to enable it to rotate freely but axially fixed on the shaft or axle 9, or the axle or shaft 9 may be rotary and have the fifth gear wheel fixed to it. When the fifth gear wheel 5 is journalled, it is preferably by means of a plain bearing, but if desired a rolling bearing, e.g. a needle bearing, may be used. The arrangement of the gear wheels is such that the third gear wheel 3 is fixed on the input shaft 7, the fourth gear wheel 4 is journalled to enable it to rotate freely but axially fixed on the input shaft 7 and constitutes the pinion 4, and the first gear wheel 1 and the fourth gear wheel 4 are in constant meshing engagement with each other as are the second gear wheel 2 and the third gear wheel 3. The first gear wheel 1 is in constant meshing engagement also with the fifth gear wheel 5, that constitutes the second pinion. All three shafts 7, 8, and 9 are parallel to one another and mounted in bearing housings (not shown), and the input shaft 7 may be rotated manually by a crank (not shown) with one or more arms or by a motor.

Like in FIG. 2, the fourth gear wheel 4 is free to rotate on the input shaft 7, but in FIGS. 3 and 4 the third gear wheel 3 is in constant meshing engagement with the second gear wheel 2. As both of the second and the first gear wheels, 2 and 1, respectively, are fixed to the intermediate shaft 8, the rotation of the input shaft 7 is transferred to the first gear wheel 1, which is in constant meshing engagement with both the fourth gear wheel 4 and the fifth gear wheel 5. Also in this embodiment, the first gear wheel 1 and the third gear wheel 3 are comparatively small gear wheels having fourteen teeth, for example, while the second gear wheel 2, the fourth gear wheel 4, and the fifth gear wheel 5 are larger and may have twenty-eight teeth, for example. Thus, in this example, the input shaft 7 has to make four revolutions to make the fourth and the fifth gear wheels, i.e. the pinions 4 and 5, make one revolution. Consequently, with the data given above, a complete revolution of the input shaft 7 will move the carriage a distance corresponding to seven teeth.

By using the additional pinion gear wheel 5, the number of pinion teeth in meshing engagement with the rack teeth is doubled, at least theoretically, which reduces the stress on the teeth. Thereby, the rack and pinion transmission will get increased durability, which is of special importance in cases where the drill gets stuck during drilling and the operator is trying to make it come loose again. In addition, the solution is space saving, since pinion gear wheel 4 is mounted on the input shaft 7 and does not require an extra shaft.

In a third preferred embodiment, not shown, the two-speed gearbox shown in FIGS. 1 and 2 is modified by incorporation of the fifth gear wheel 5 and its shaft or axle 9, in a manner such that the fifth gear wheel 5 forms a second pinion and cooperates with the first gear wheel 1 and the rack 6 as in single speed gearbox of FIGS. 3 and 4. Thus, the first gear wheel 1 is in a constant meshing engagement with the fourth gear wheel 4 and the fifth gear wheel 5, and both of the fourth and the fifth gear wheels 4 and 5 constitute pinions that are in simultaneous meshing engagement with the rack 6.

Figure 5:
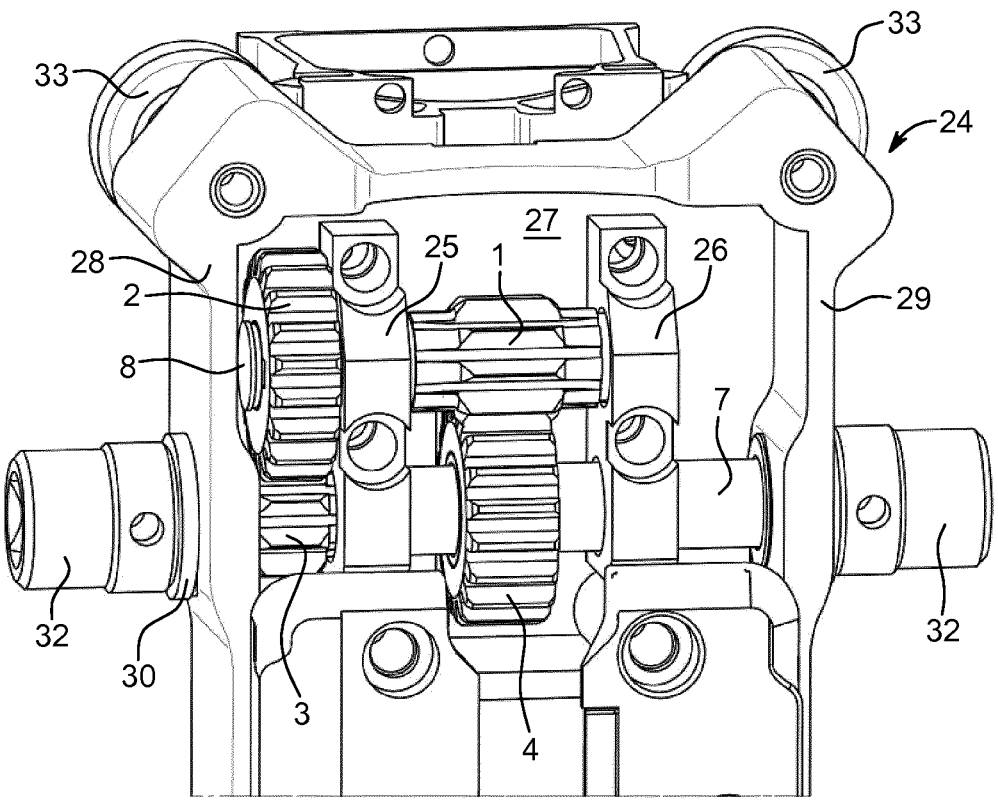
FIG. 5 is an isometric view of an upper portion of a single-speed gearbox having a gear train with a single pinion for engagement with a rack.
Figure 6:
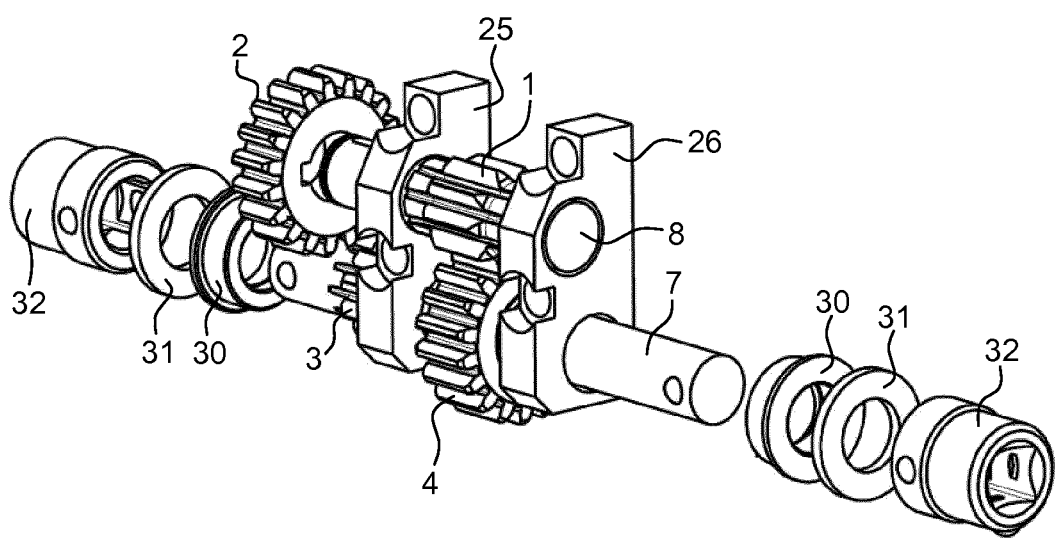
FIG. 6 is an isometric view of the gear train of FIG. 5.

In a fourth preferred embodiment shown in FIGS. 5 and 6, the gearbox has a gearbox housing 24, of which an upper portion is shown. The gearbox housing 24 has a cover (not shown) and is integral with a carriage and consequently has an upper and a lower pair of wheels for guiding the carriage along the rack (not shown). The upper pair of wheels 33 are shown. The gearbox is a single speed gearbox having a single pinion. It differs from the embodiment shown in FIGS. 3 and 4 by not having the second pinion 5 and its associated additional shaft 9, and from the one shown in FIGS. 1 and 2 by not having the input shaft 7 axially displaceable but axially fixed. In this fourth preferred embodiment, the gearbox includes a reduction gear train 1-4 having a first 1, a second 2, a third 3, and a fourth 4 gear wheel, where the fourth gear wheel is the pinion 4 in rotary engagement with the rack (not shown). Further, the gearbox includes an input shaft 7 operatively connected to the gear train 1-4 to effect a linear relative movement between the rack 6 and the pinion 4, and an intermediate shaft 8 on which the first 1 and the second 2 gear wheels are fixed in a side by side relationship, one on each side of the bearing housing 25. The arrangement of the gear wheels is such that the third gear wheel 3 is fixed on the input shaft 7 on one side of the bearing housing 25, and the fourth gear wheel 4 is journalled to enable it to rotate freely but axially fixed on the input shaft 7 and constitutes the pinion 4 on the other side of the bearing housing 25. The fourth gear wheel 4 is journalled on the input shaft 7 by means of a bearing, preferably a plain bearing, but if desired a rolling bearing, e.g. a needle bearing, may be used. The first gear wheel 1 and the fourth gear wheel 4 are in constant meshing engagement with each other as are the second gear wheel 2 and the third gear wheel 3.

The two shafts 7 and 8 are parallel to one another and mounted in bearing housings 25 and 26, where bearing housings 10 and 12 in FIGS. 1 and 2 are an integral unit forming bearing housing 25, while bearing housings 11 and 13 likewise are an integral unit forming bearing housing 26. The bearing housings 25 and 26 are attached by screws (not shown) a rear wall 27 of the gearbox housing 24. The input shaft 7 may be rotated manually by a crank (not shown) with one or more arms or by a motor (not shown), and it extends through at least one side wall 28 and/or 29 of the gearbox housing 24. In the embodiment shown in FIG. 5, the input shaft 7 extends out through both of the vertical side walls 28 and 29 of the gearbox housing 24. As is best shown in FIG. 6, the ends of the input shaft 7 are mounted in sleeves 30, and outside each sleeve 30 the shaft 7 carries a washer 31 and a coupling member 32 for attachment of said crank or motor (not shown). Thereby it is possible to connect the crank or motor on the left-hand side or the right-hand side of the rack 6 in view of the available space, for example.

Like in FIGS. 3 and 4, the fourth gear wheel 4 is free to rotate on the input shaft 7, the third gear wheel 3 is in constant meshing engagement with the second gear wheel 2. As both of the second and the first gear wheel wheels, 2 and 1, respectively, are fixed to the intermediate shaft 8, the rotation of the input shaft 7 is transferred to the first gear wheel 1, which is in constant meshing engagement with the fourth gear wheel 4. Also in this embodiment, the first gear wheel 1 and the third gear wheel 3 are comparatively small gear wheels having fourteen teeth, for example, while the second gear wheel 2, and the fourth gear wheel 4, are larger and may have twenty-eight teeth, for example. Thus, in this example, the input shaft 7 has to make four revolutions to make the fourth gear wheel, i.e. the pinion 4, make one revolution. Consequently, with the data given above, a complete revolution of the input shaft 7 will move the carriage a distance corresponding to seven teeth. An important advantage of this fourth embodiment is that the gearbox is simple and does not require a third shaft for transforming the rotation of the input shaft to a precise travel of the gearbox along the rack.

In the embodiments shown in FIGS. 3-6, the second gear wheel 2 and the third gear wheel 3 are in constant meshing engagement with each other. Further, in the embodiments described above, the first gear wheel 1 and the third gear wheel 3 have a first identical number of teeth, and the second gear wheel 2 and the fourth gear wheel 4 have a second identical number of teeth. However, in an embodiment not described, the first gear wheel 1 may have fewer teeth than the third gear wheel 3, and the fourth gear wheel 4 may have more teeth than the second gear wheel 2. In addition, the gear wheels may be spur gears as shown in the drawings or helical gears.

Figure 7:
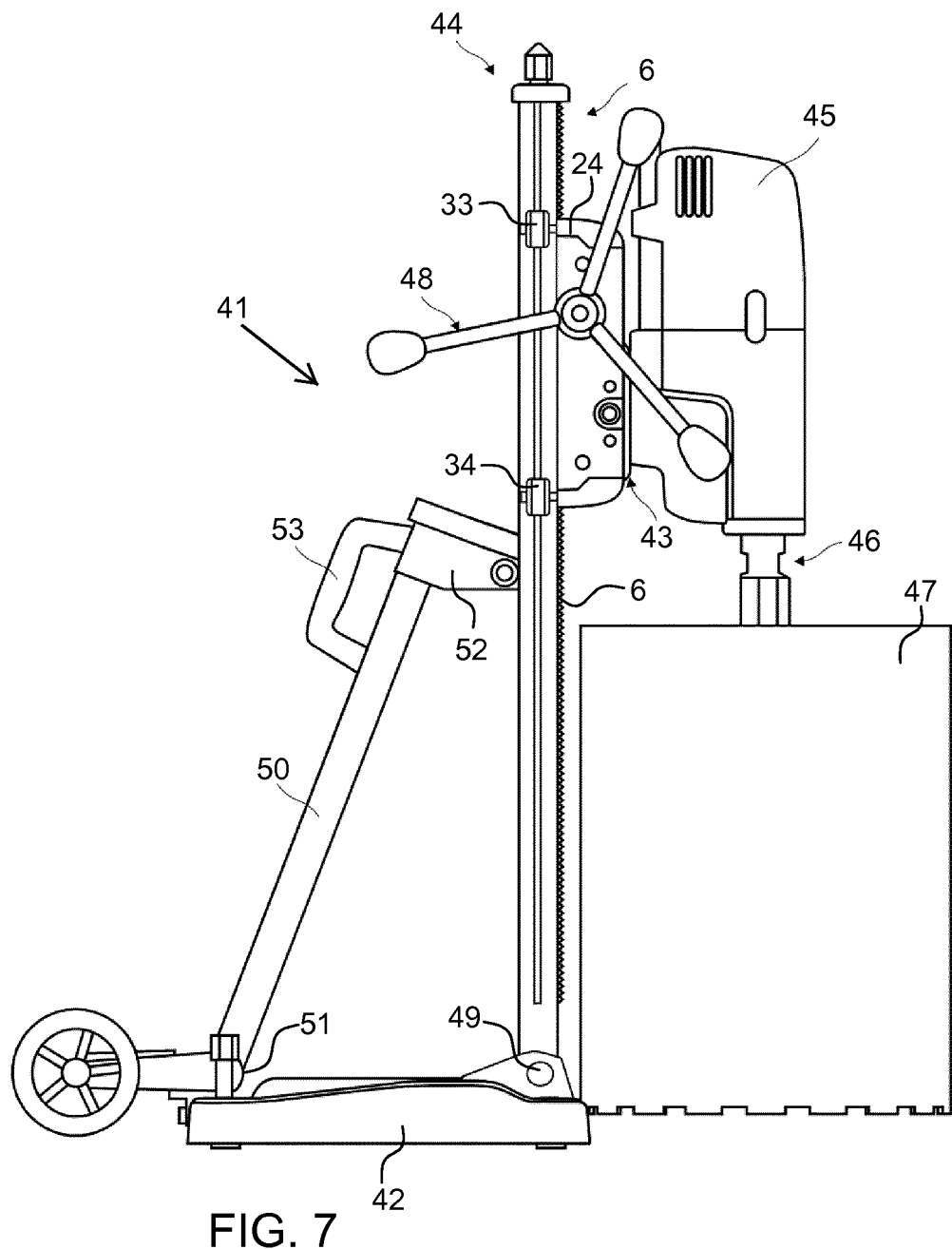
FIG. 7 is a side view of a drill stand including a drill column having a rack, and a drill carriage movable along the drill column by a rack and pinion transmission.

FIG. 7 shows a drill stand 41 including a drill column 44 supporting a rack 6 running along the drill column 44, and a carriage 43, arranged on the drill column 44 and engaging the rack 6 by a rack and pinion transmission for movement up and down the rack 6. The rack and pinion transmission is suitably provided by a gearbox of the kind described in the embodiments described in relation to FIG. 1-6. The gearbox being housed in a gearbox housing 24 which is integral with the carriage 43. The carriage 43 comprises an upper pair of wheels 33 and a lower pair of wheels 34 for guiding the carriage 43 along the drill column 44. The carriage is further provided with a feeder handle 48 for moving the carriage along the rack 6 of the drill column 44. The carriage 44 is carrying a drill motor 45 to which a drill hit 47 is attached by means of a drill chuck 46.

The drill stand 41 further comprises a base plate 42, which is adapted to be fastened to a floor or a wall, for instance by using an expander bolt or using a vacuum system. The drill column 44 is pivotally mounted to a front part of the base plate 2 and turns around a drill column axle 49. Also, the drill column 44 is supported by a hack support 50, which is pivotally mounted to a back part of the base plate 42 and turns around a hack support axle 51. The back support 50 is attached to the drill column 44 by means of a clamping arrangement 52. On the rear side of the hack support 50 a carry handle 53 for transportation of the drill stand 41 is provided.

Even though the gearbox of the invention above is described as suitable for use in drill stands, where the rack can be regarded as stationary, even if the drill stand as such is movable, the gearbox of the invention may be stationary and move the rack back and forth.

INDUSTRIAL APPLICABILITY

The gearbox of the invention is applicable where a rack and pinion linear transmission is used for making the pinion make a relative movement along the rack.

The invention claimed is:

1. A gearbox for a rack and pinion linear transmission, said gearbox including
   a reduction gear train having at least a first gear wheel, a second gear wheel, a third gear wheel, and a fourth gear wheel, where the fourth gear wheel is the pinion for rotary engagement with a rack;
   a rotary input shaft operatively connected to the gear train to effect a linear relative movement between the rack and a pinion; and
   an intermediate shaft on which the first and the second gear wheels are fixed;
   wherein:
   the third gear wheel is fixed on the input shaft, and the fourth gear wheel is journalled on the input shaft to enable the fourth gear wheel to rotate freely relative to the input shaft, and the first gear wheel and the fourth gear wheel are in constant meshing engagement with each other.

2. The gearbox as claimed in claim 1, wherein the first gear wheel and the third gear wheel have a first identical number of teeth, and the second gear wheel and the fourth gear wheel have a second identical number of teeth.

3. The gearbox as claimed in claim 1, wherein the first gear wheel has fewer teeth than the third gear wheel, and the fourth gear wheel has more teeth than the second gear wheel.

4. The gearbox as claimed in claim 1, wherein the first, second, third and fourth gear wheels are spur gears.

5. The gearbox as claimed in claim 1, wherein the first, second, third and fourth gear wheels are helical gears.

6. The gearbox as claimed in claim 1, wherein the fourth gear wheel is journalled on the input shaft by means of a plain bearing.

7. The gearbox as claimed in claim 1, wherein an additional shaft is provided, on which a fifth gear wheel is mounted, and wherein the input shaft drives the third gear wheel that is fixed on the input shaft, the third gear wheel is in meshing engagement with the second gear wheel and thereby also drives the first gear wheel, the first and the second gear wheels both being fixed to the intermediate shaft, and the first gear wheel is in meshing engagement with the fifth gear wheel as well as with the fourth gear wheel which fourth gear wheel rotates freely but is axially fixed on the input shaft, wherein both of the fourth gear wheel and the fifth gear wheel constitute pinions, so that the pinions comprised by the fourth gear wheel and the fifth gear wheel can engage the rack simultaneously.

8. The gearbox as claimed in claim 1, wherein the second gear wheel and the third gear wheel are in constant meshing engagement with each other.

9. The gearbox as claimed in claim 1, wherein the fourth gear wheel and the input shaft are displaceable relative to each other between two positions, and a locking device is provided for locking the fourth gear wheel to the input shaft at one of the two positions but permitting the fourth gear wheel and the input shaft to rotate freely relative to each other in the other of the two positions.

10. The gearbox as claimed in claim 9, wherein the fourth gear wheel is axially fixed in the gearbox and constitutes the pinion, while the input shaft is axially displaceable in the gearbox.

11. The gearbox as claimed in claim 9, wherein the locking device comprises a locking member having a portion projecting radially from the input shaft, and a side of the fourth gear wheel has a recess matching said portion of the locking member.

12. The gearbox as claimed in claim 11, wherein the locking member is a locking pin.

13. The gearbox as claimed in claim 9, wherein a mechanism is provided for displacing the input shaft between said two positions.

14. The gearbox as claimed in claim 9, characterized by having two reduction ratios, including:
   a first reduction ratio where the fourth gear wheel is locked to the input shaft; and
   a second reduction ratio where the input shaft drives the third gear wheel that is fixed on the input shaft, the third gear wheel in turn driving the second gear wheel and thereby also the first gear wheel, both the first gear wheel and the second gear wheel being fixed to the intermediate shaft, and the first gear wheel driving the fourth gear wheel that rotates freely on the input shaft, so that the gearbox is a two-speed gearbox.

15. The gearbox as claimed in claim 9, wherein an additional shaft is provided carrying a fifth gear wheel, and wherein the first gear wheel is in a constant meshing engagement with the fourth gear wheel and the fifth gear wheel, and both of the fourth and the fifth gear wheels constitute pinions that can be set in simultaneous meshing engagement with the rack.

16. The gearbox as claimed in claim 15, wherein the fifth gear wheel is journalled on the additional shaft via a plain bearing.

17. A drill stand including a drill column supporting a rack running along the drill column, and a carriage arranged on the drill column, the carriage including a gearbox engaging the rack by a rack and pinion transmission for movement up and down the rack, wherein the rack and pinion transmission is provided by the gearbox and rack according to claim 1.

* * * * *